United States Patent [19]
Laskaris et al.

[11] Patent Number: 5,727,933
[45] Date of Patent: Mar. 17, 1998

[54] PUMP AND FLOW SENSOR COMBINATION

[75] Inventors: Michael A. Laskaris, Collegeville; Glenn D. Quinty, Harleysville, both of Pa.

[73] Assignee: Hale Fire Pump Company, Conshohocken, Pa.

[21] Appl. No.: 575,213

[22] Filed: Dec. 20, 1995

[51] Int. Cl.$^6$ ..................................... F01C 21/00
[52] U.S. Cl. .................. 418/2; 418/40; 418/206.1; 417/43; 417/63; 417/212; 73/861.77
[58] Field of Search ................ 418/2, 40, 206.1, 418/206.5; 417/43, 63, 212, 410.4; 73/861.77, 861.94

[56] References Cited

U.S. PATENT DOCUMENTS

| | | |
|---|---|---|
| 1,137,927 | 5/1915 | Thomas . |
| 1,477,850 | 12/1923 | Pool . |
| 2,083,167 | 6/1937 | Lamere . |
| 2,349,310 | 5/1944 | Schnell . |
| 2,543,941 | 3/1951 | Sargent . |
| 2,651,995 | 9/1953 | Blackburn . |
| 2,696,266 | 12/1954 | Tuve . |
| 2,750,891 | 6/1956 | Berry . |
| 2,936,835 | 5/1960 | Sheppard . |
| 3,223,040 | 12/1965 | Dinkelkamp . |
| 3,552,603 | 1/1971 | Hrivak . |
| 3,584,977 | 6/1971 | Coleman, II et al. . |
| 3,633,420 | 1/1972 | Holzem . |
| 3,714,988 | 2/1973 | Livingston . |
| 4,032,259 | 6/1977 | Brown ........................ 417/43 |
| 4,042,149 | 8/1977 | Main . |
| 4,063,824 | 12/1977 | Baker et al. ................. 417/43 |
| 4,246,969 | 1/1981 | McLoughlin et al. . |
| 4,278,132 | 7/1981 | Hostetter . |
| 4,324,294 | 4/1982 | McLoughlin et al. . |
| 4,328,824 | 5/1982 | Kiernan et al. . |
| 4,409,829 | 10/1983 | Weber . |
| 4,448,256 | 5/1984 | Eberhardt et al. . |
| 4,568,248 | 2/1986 | Harders . |
| 4,656,827 | 4/1987 | Puillet . |
| 4,824,342 | 4/1989 | Buck . |
| 4,878,454 | 11/1989 | Cann . |
| 4,899,825 | 2/1990 | Bosoni et al. . |
| 4,925,370 | 5/1990 | Tallarita . |
| 5,027,653 | 7/1991 | Foran, Jr. .................. 418/206.5 |
| 5,050,094 | 9/1991 | Kitano . |
| 5,092,824 | 3/1992 | Connett . |
| 5,125,806 | 6/1992 | Quick et al. . |
| 5,145,014 | 9/1992 | Eberhardt . |
| 5,169,292 | 12/1992 | Loubier et al. . |
| 5,174,383 | 12/1992 | Haugen et al. . |
| 5,184,519 | 2/1993 | Ciarelli et al. ............. 73/861.77 |
| 5,232,052 | 8/1993 | Arvidson et al. . |
| 5,234,017 | 8/1993 | Aslin et al. . |
| 5,248,245 | 9/1993 | Behnke et al. . |
| 5,255,747 | 10/1993 | Teske et al. . |
| 5,257,919 | 11/1993 | Lew . |
| 5,291,951 | 3/1994 | Morand . |
| 5,313,548 | 5/1994 | Arvidson et al. . |
| 5,393,203 | 2/1995 | Hantle . |
| 5,411,100 | 5/1995 | Laskaris et al. . |
| 5,553,493 | 9/1996 | Box et al. .................. 73/861.77 |

FOREIGN PATENT DOCUMENTS

| | | |
|---|---|---|
| 57-389 | 5/1980 | Japan . |
| 2021821 | 12/1979 | United Kingdom .......... 417/43 |

*Primary Examiner*—Charles G. Freay
*Attorney, Agent, or Firm*—Hill, Steadman & Simpson

[57] ABSTRACT

A pump for use in additive systems such as foam chemical additive systems for fire fighting water, the pump including impeller elements and flow meter elements in a common casing. The pump casing provides a gear pump arrangement using two enmeshed gears on an inlet side, and a closely adjacent gear flow meter arrangement downstream of the gear pump arrangement within the same pump casing. The gear flow meter elements are driven only by the force of liquid pumped by the enmeshed gears of the gear pump and cause very low pressure drop across the flow meter elements. Therefore, inaccurate measurements of flow rates due to slippage and viscosity variation are reduced compared to measuring the rotary speed of gear pump gears directly. The system is optimally used to meter and add foam chemical into a pressurized water line for fighting fires.

25 Claims, 4 Drawing Sheets

PUMP AND FLOW SENSOR COMBINATION

BACKGROUND OF THE INVENTION

The present invention relates to pumps. Advantageously the pump can be used for a proportioning system, and in particular a foam concentrate proportioning system for fire fighting applications.

In foam concentrate proportioning systems for fire fighting, a foam chemical concentrate is injected into a raw water stream to be dispensed as a mixture onto a fire. Such systems are described for example in U.S. Pat. No. 5,174,383. In such systems, the foam chemical is metered into the water stream by controlling the speed of a positive displacement pump which takes suction from a chemical storage tank and discharges the chemical into the water supply line. The water flow is metered and a signal is provided to a control system for regulating the speed of the positive displacement pump to vary the flow rate of foam chemical. U.S. Pat. No. 5,232,052 describes a compressed air foam system wherein water flow rate is used to control the speed of a foam pump for delivering foam concentrate from a tank. U.S. Pat. No. 5,411,100 describes a system for proportioning water, air and foam chemical into a fire fighting mixture.

An electronic automatic foam concentrate proportioning system typically consists of several elements. A microprocessor controls a system while sensors feed information to the microprocessor. Known systems have two types of sensors, a flow sensor in the main water flow line to monitor water flow and a feedback sensor providing the microprocessor with data on how much foam chemical is injected, wherein the controller sends a signal to the foam chemical pump drive regulating the proportion of foam chemical to water. An operator can set the percentage of foam chemical to be injected by way of the microprocessor. The feedback of the foam chemical quantity in the prior art is typically by a speed signal of the foam chemical concentrate positive displacement pump or gear pump.

A gear set is driven to pump the foam chemical liquid and typically produces discharge pressure from zero PSI to 400 PSI. At higher pressures there is a significant "slip" or recirculation in the gear pump element. This is typical for gear pumps. This slip can be compensated for with a mathematical correction formula dependent on fluid viscosity, temperature and discharge pressure to estimate the actual delivery volume from a pump at any given pump speed. However, in fire fighting application, the viscosity is typically not known and in some chemicals to be pumped, the viscosity is thixotropic, i.e., the viscosity changes greatly with changes in shear (velocity). These factors tend to make gear pumps operate as non-positive displacement pumps. Typically this means that the gear pump volumetric efficiency is not only less than 100%, it varies with discharge pressure, pump speed, temperature and viscosity. Therefore, simply using pump RPM as a feedback signal can be inaccurate.

SUMMARY OF THE INVENTION

It is an object of the present invention to provide a compact and reliable pump and flow meter combination which can be used to accurately measure the volumetric flow from the pump for control and/or measurement and/or data acquisition. It is an object that the flow meter be accurate irrespective of pressure difference across the pump. It is an object that slippage of fluid across the pump and varying viscosity be compensated for to retain accuracy.

It is an object of the present invention to provide a pump and flow meter combination apparatus for a chemical and water proportioning system which allows for the accurate measurement of chemical quantity into a pressurized water line. It is an object of the present invention to provide such a pump which can be used in fire fighting applications. It is an object of the present invention to provide that such a pump can be carried on a fire truck and operated from the power train available on a fire truck.

It is an object of the present invention to provide a chemical pump which can take suction from a supply of chemical, and can pump a controlled quantity of chemical into a pressurized liquid, such as water. It is an object of the invention to provide an accurate method of measuring the flow from the chemical pump despite a wide turn down ratio of differential pressures across the pump. It is an object of the invention to provide a flow sensing device which can provide an accurate signal to a pump volume control system which regulates the amount of flow from the chemical pump.

The objects of the invention are achieved in that a pump is provided for proportioning chemical with liquid such as for proportioning a chemical foam concentrate into a pressurized fire fighting water line.

In a typical application, a flow meter in the water line provides a control signal to a system microprocessor. The microprocessor receives a second flow signal from a chemical flow meter located in the outlet stream of the chemical pump. The output of the chemical is quantitatively compared to the water flow signal for correct proportioning and a control signal is created by the microprocessor to alter the driven speed of the chemical pump to change an output flow quantity of the chemical pump to maintain correct proportions.

According to the invention, a foam chemical flow sensing element is arranged in the same pump housing as the gear pump. A first set of gears for the gear pump are arranged side by side with a second set of gears which perform a different function. A major drawback of gear pumps is that these devices are not truly positive displacement over the range of conditions experienced by a foam proportioning system. The chief cause of this characteristic is clearances in the pump through which small quantities of fluid escapes or recirculates. This recirculation flow is increased with increasing pressure across the gear pump, and accordingly the second set of gears in series is a much better positive displacement feedback than the first set. The second set of gears is free spinning and does no work other than overcome friction. There is therefore no pressure rise across the second set of gears and almost no pressure drop. Therefore, there is almost no leakage and the second set of gears has a very high and consist volumetric efficiency. This makes the second set of gears a very accurate flow sensing feedback device.

The invention also provides the advantage that by using the pump gear set and flow meter gear set in the same housing, the design allows for a single critical set of dimensions, the axial clearance to be maintained by grinding, either as matched sets or as precision separate operations. Axial clearance determines the pump pressure capability when pumping thin liquids. As a fire fighting foam chemical pump must pump both thin and viscous fluids, close tolerance control is an important consideration. From a performance stand point, the fluid exiting the pump element is discharged directly into the flow sensing element with nearly zero change in velocity. For viscous and thixotropic fluids, this can help keep the viscosity more consistent across a range of pump volumes and velocities. Elbows, changes in diameter, and air traps can all cause flow meter problems at installation and these are eliminated as potential problems with pumping and sensing elements contained in one housing. Thus, the pump and flow meter gear sets in the same housing has advantages for both manufacturing, installation cost reduction, and performance.

The speed and therefore flow of the second set of gears can be measured with an RF type proximity sensor which can detect the presence of individual teeth or targets embedded in a non-magnetic material gear. The signal from this sensor is a linear pulse train proportional to the flow.

The sensor must possess a very wide range (turn-down ratio). The range of the flow sensor is even more important in a fire fighting application because the chemicals pumped are often used at different concentration ratios. Typically a foam concentrate pump is called upon to proportion at percentages of 0.1 to 3%. This is a 30:1 turn-down ratio at a constant flow. However, fire fighting flows also vary. A minimum flow may be from 22.50 GPM, while medium flows may be in the range of 250 to 500 GPM. High flows can run well over a 1,000 GPM. The result of these flow ranges and proportion ranges can be a 1500:1 turn-down ratio. When foams are used at 6%, this range can be considerably larger. Inaccurate pump flow sensors waste foam at a high cost, and they can create fire fighting hazards as foam ratios far from the proper range can have reduced performance.

To obtain the large turn-down ratio and large flow range specified, a wide turn-down ratio of speeds is required for the flow of sensing element gears. The minimum flow sensor speed is defined by the stall speed. At this speed, friction overcomes the available torque from the gear elements and the gears stall. Friction is already minimized by using a non-contact RF sensor, mentioned earlier that is non-magnetic so that it does not place drag on the gear set. This type of pump, running the type of fluids encountered in this application, would normally be configured with carbon composite bushings. However, these bushings require a good film of fluid to create a low friction, hydrodynamic bearing. The low lubricity of many foam concentrates yield high friction values with industry standard bearings.

Typically to overcome these high frictions, the present invention utilizes a lobed rotor type gear. However, typical lobed type gear pumps require critical timing through external timing gears and required seals. In addition to adding cost and complexity including size, weight and maintenance, the seals create too much drag which increases pressure drop, which increases leakage and ruins the volumetric efficiency for low flow performance of this device. According to the invention, a five lobe rotor is utilized that is self timing and therefore requires no seals or additional timing gears. This allows the second gear set to run freely in the housing with minimal friction and therefore a lower stall speed and higher turn-down ratio.

DETAILED DESCRIPTION OF THE PREFERRED EMBODIMENTS

Figure 1:
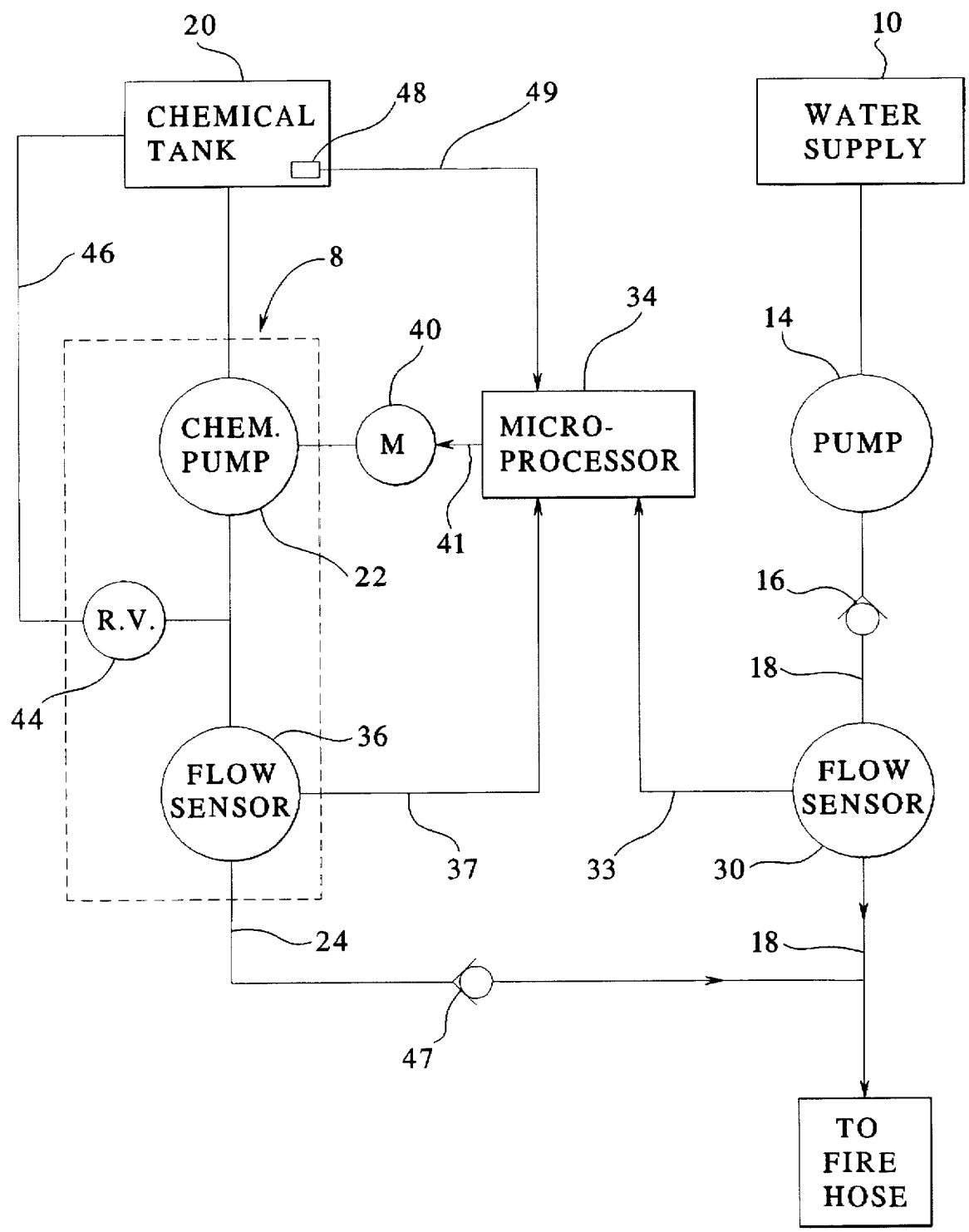
FIG. 1 is a schematic block diagram of a foam concentrate proportioning system for fire fighting.

FIG. 1 illustrates a pump assembly 8 of the present invention used in a simple flow system for injecting chemical foam concentrate into a water line for producing a fire fighting mixture of water and foam. In the system shown, raw water 10 is pumped through a water pump 14 through a check valve 16, to a water dispensing pipe 18. Typically, the raw water supply 10 is in the form of a tank or fire hydrant and the pump is a high volume, high pressure gear pump driven by the engine of the fire truck. A chemical tank 20 is provided on the fire truck which hold a concentrated solution of foaming chemical. The chemical within a selected one of the chemical tanks 20 is delivered by a chemical pump 22 through a line 24 to the pipe 18 to mix with the water. The water delivered by the pump 14 through line 18 passes through a flow sensor 30. The flow sensor 30 can be a paddle type flow sensor or other flow meter which signals pumped water flow rate. The flow sensor 30 communicates through a signal line 33 to a microprocessor/controller 34 for feedback.

The chemical delivered through line 24 passes through a flow sensor 36 (shown in FIG. 2) which communicates a signal by signal line 37 to the microprocessor 34. The microprocessor adjusts the proper ratio between chemical and water by adjusting the speed of the chemical pump 22 by controlling its drive motor 40 by an output signal through a signal line 41. Controls for controlling motors are disclosed in, for example, U.S. Pat. Nos. 5,174,383 and 5,232,052. The drive motor 40 can be a direct drive variable speed electric motor, a hydraulic drive such as disclosed in U.S. Pat. No. 4,436,487, or other known rotary drive means. The signal line 41 can communicate to a motor control for an electric motor or to the pump driving a hydraulic motor, or other methods to adjust the speed of the driving motor.

The chemical pump 22 is also provided with a relief valve 44 connected to a relief line 46 to prevent over pressuring of the pump casing. The relief line 46 can be connected back to the tank 20. A check valve 47 can be provided in the line 24. A level sensor 48 can be located in the tank 20 to output a level signal or low level warning signal to the microprocessor 34 via signal line 49.

Figure 2:
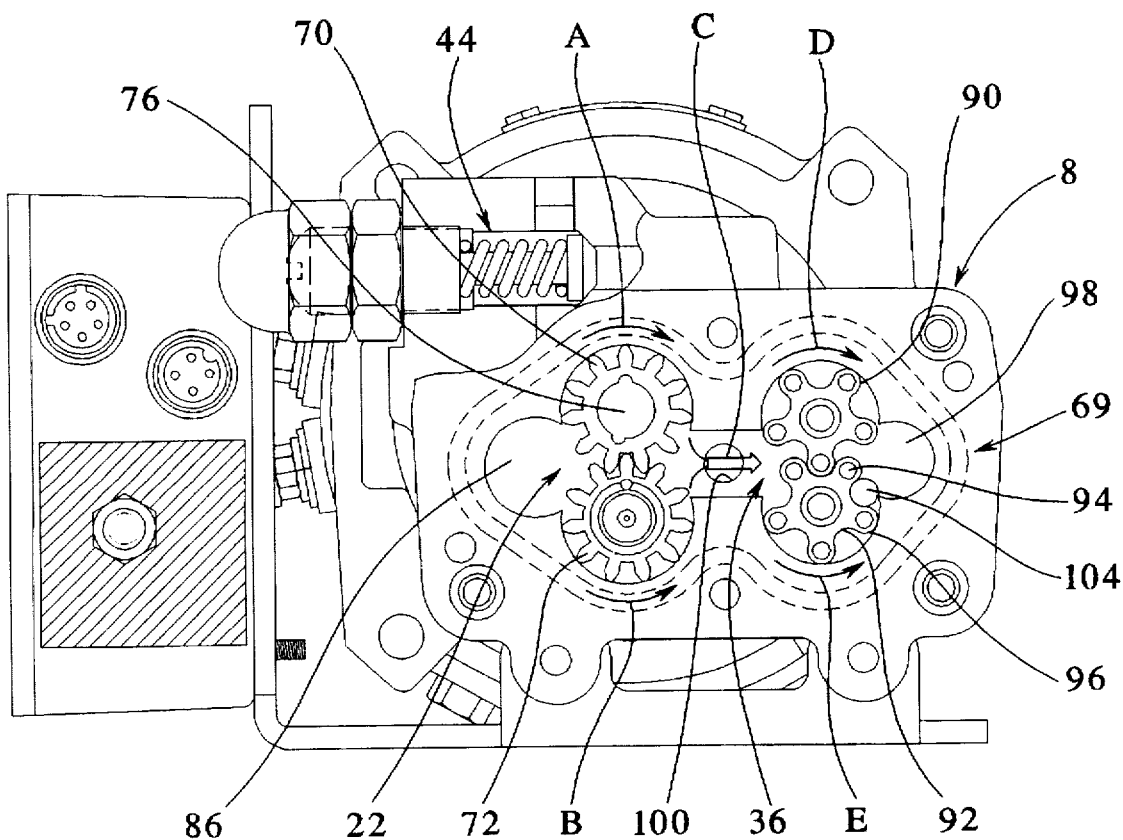
FIG. 2 is a cross sectional view taken generally through line II—II from FIG. 3.
Figure 3:
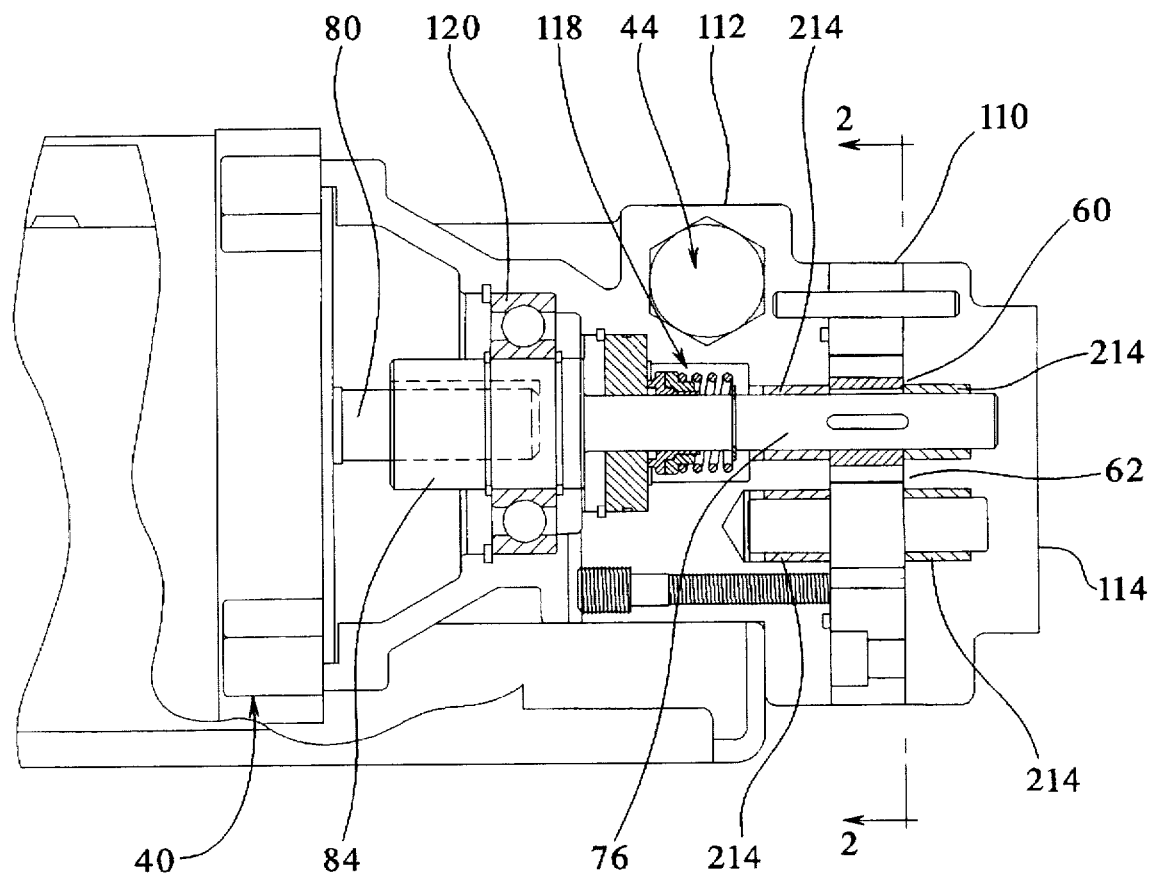
FIG. 3 is elevational view of the pump shown in FIG. 2 with a portion of the casing removed for clarity.

FIG. 2 illustrates the inventive foam concentrate pump assembly of the present invention which includes a stationary casing 69 holding meshed gear elements 70, 72 of the spur gear type, the gears 70 being driven by a pump input shaft 76 which is coupled to a motor output shaft 80 by a coupling 84 as shown in FIG. 3. Water proceeds through an inlet area 86 and passes around the rotating gear 70, 72 in the directions marked A, B, and then flows in the direction C to first and second meter gears 90, 92.

The gear 92 can be composed of a nonmagnetic material and provides around its periphery five magnetic material feedback targets 94, one applied onto or embedded into each lobe 96 of the gear 92. In the preferred embodiments, the gears 90, 92 are identical five lobed rotors although other types and numbers of teeth or lobes can be used. The foam chemical flows around the spinning rotors 90, 92 in the direction D, E to an outlet area 98 to the line 24 as shown in FIG. 1. A passage 100 is provided between the gear set 70, 72 and 90, 92 which allows chemical to flow to the relief valve 44 for recirculation back to the chemical tank.

A sensing element 104 is provided mounted to the stationary casing 69 which senses the feedback targets 94 passing thereby to output a digital count to the microprocessor 34. The sensing element 104 is advantageously a noncontact, nonmagnetic RF sensor to sense the targets embedded in a nonmagnetic material gears so as to minimize drag on the gear set. Other known sensors can also be used such as optical, inductive coil, Hall effect, etc.

The meter gears 90, 92 and the sensing element 104 make up the flow sensor 36.

The microprocessor 34 of FIG. 1 can use the digital count of the sensing element 104 as a chemical volumetric flow quantity for adjustment of the proportion between the chemical flow and the water flow. A motor drive control means can be coupled to the microprocessor, for generating a control signal for controlling the speed of the drive motor 40. Such means are disclosed for example in U.S. Pat. Nos. 5,174,383 and 5,232,052.

FIG. 3 shows the arrangement of the pump wherein the stationary casing includes a pump chamber plate 110 arranged between an inboard casing 112 and an outboard casing or cover 114. The pump body is referred to as a "sandwich pump body" because it is sandwiched between these two casings. The pump input shaft 76 is sealed by a spring loaded mechanical seal 118 at an inboard end where the pump enters the casing 112. The coupling 84 is journaled by a sleeved ball bearing 120. The drive motor 40 is shown with the extending drive shaft 80.

Figure 4:
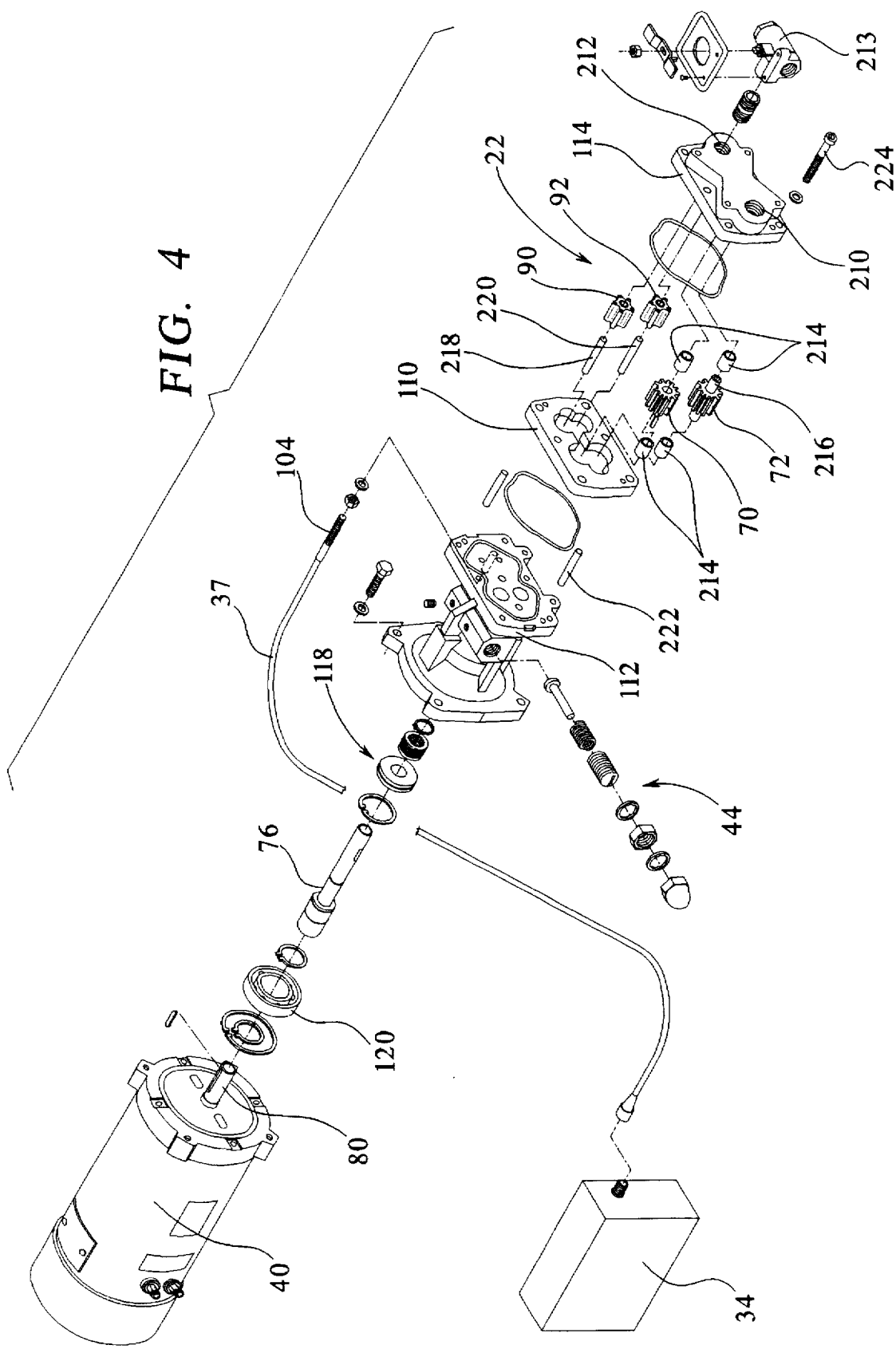
FIG. 4 is a partial exploded perspective view of the apparatus of FIG. 1.

FIG. 4 illustrates component parts of the apparatus of FIG. 4. The outboard casing 114 provides a foam chemical inlet 210 for connection to the tank 20 and a foam chemical outlet 212 for communicating with the chemical line 24 (shown in FIG. 1). A shutoff valve 213 can be provided connected to the chemical outlet 212.

The microprocessor/controller 34 is shown schematically as a block. The microprocessor/controller receives a signal from the sensor 36, particularly from the sensing element 104 which registers counts from either passing teeth 96 of the gear 92 or passing targets 94. The pump gears 70, 72 are suspended on bushings 214 held within the inboard casing 112 and outboard casing 114. The gear 72 is an idler gear provided with a gear spindle 216.

The meter gears 90, 92 are suspended by elongate spindles 218, 220 between the inboard and outboard casings 112, 114. The pump casings 112, 114 and the pump chamber plate 110 are sandwiched together and held by dowels 222 and a plurality of cap screws 224. An advantage of this configuration is that close tolerance axial clearance between the gears 70, 72 and the casings 112, 114 and between the gears 90, 92 and the casings 112, 114 can be machined in a common operation such as by grinding. Also, the direct path between pump 22 and flow meter 36 eliminates problems associated with flow meters located in piping, including elbows, reduced diameters and air traps.

An advantageous construction of the chemical pump in the form of a gear pump with an integrally assembled downstream gear type flow meter allows an accurate proportioning of foam chemical concentrate over a wide turn down ratio.

Although the present invention has been described with reference to a specific embodiment, those of skill in the art will recognize that changes may be made thereto without departing from the scope and spirit of the invention as set forth in the appended claims.

I claim as my invention:

1. A pump and flow sensor combination comprising:

a pump casing having an inlet and an outlet and an inside surface;

a pump drive shaft connectable to a motor outside said pump casing and penetrating said pump casing;

a first gear and a second gear within said pump casing and enmeshed for opposite rotation, said first gear connected to said pump drive shaft for driven rotation therewith, said first and second gears being closely journaled partially by said inside surface of said pump casing and arranged to receive fluid flow from said inlet on a demeshing side of said first and second gears;

third and fourth circular gears arranged in said pump casing downstream of said first and second gears, said third and fourth gears enmeshed and closely journaled partially by said inside surface of said pump casing, a demeshing side of said third and fourth gears receiving flow from an enmeshing side of said first and second gears, and an enmeshing side of said third and fourth gears open to said outlet of said pump casing, said third and fourth gears and said first and second gears being coplanar; and said third and fourth gears driven by fluid pumped by said first and second gears; and a sensor means for sensing a rotational speed of one of said third and fourth gears for determining the flow rate of liquid pumped by said first and second gears.

2. The pump and flow sensor combination according to claim 1 wherein said third and fourth gears comprise lobed rotors.

3. The pump and flow sensor combination according to claim 1 wherein said sensor means comprises a noncontact, nonmagnetic RF sensor.

4. The pump and flow sensor combination according to claim 2 wherein said third and fourth gears are composed of a nonmagnetic material and one of said third and fourth gears comprises targets embedded in said gear for sensing by said sensor means.

5. The pump and flow sensor combination according to claim 2 wherein said sensor means senses individual teeth of one of said third and fourth gear passing thereby.

6. The pump and flow sensor combination according to claim 1 wherein said pump casing comprises:

a pump chamber arranged for holding said first and second gears in a vertical arrangement, and said third and fourth gears in a vertical arrangement adjacent said first and second gears; and an inboard casing and an outboard casing arranged on opposite sides of said pump chamber, enclosing said first, second, third and fourth gears within said pump chamber.

7. The pump and flow sensor combination according to claim 6 wherein said pump chamber comprises a plate shape with a cavity therethrough forming said inside surface, said plate shape having generally planar surfaces facing said inboard casing and said outboard casing.

8. An additive metering pump comprising:

a pump casing having an inlet and an outlet;

a pump drive shaft connectable to a motor outside said pump casing and penetrating said pump casing;

a first impeller connected to said pump drive shaft for driven rotation therewith;

a second circular impeller arranged in said pump casing downstream of said first impeller;

said second impeller driven only by fluid pumped by said first impeller, said first and second impellers being coplanar; and a sensor means for sensing a rotational speed of said second impeller for determining the flow rate of liquid pumped by said first impeller.

9. The additive metering pump according to claim 8 wherein said second impeller comprises a first meter gear, and said pump further comprising a second meter gear enmeshed with said first meter gear.

10. The additive metering pump according to claim 8 wherein said sensor means comprises a noncontact, nonmagnetic sensor.

11. The additive metering pump according to claim 10 wherein said second impeller comprises a meter gear composed of a nonmagnetic material and said meter gear comprises targets embedded in said meter gear for sensing by said sensor means.

12. The additive metering pump according to claim 8 wherein said second impeller comprises a meter gear and said sensor means senses individual teeth of said meter gear passing thereby.

13. The additive metering pump according to claim 8 wherein said pump casing comprises:

a pump chamber arranged for holding said first impeller and said second impeller in laterally adjacent position; and an inboard casing and an outboard casing arranged on opposite sides of said pump chamber, enclosing said first and second impellers within said pump chamber.

14. The additive metering pump according to claim 13 wherein said pump chamber comprises a plate shape with a cavity therethrough forming said inside surface, said plate shape having generally planar surfaces facing said inboard casing and said outboard casing respectively.

15. An additive metering pump arrangement for use in a foam chemical and water proportioning system, comprising:

a pump casing having an inlet connectable to a supply of foam chemical and an outlet connectable to a supply of pressurized water and an inside surface;

a pump drive shaft penetrating said pump casing;

a first gear and a second gear within said pump casing and enmeshed together for opposite rotation, said first gear connected to said pump drive shaft for driven rotation therewith, said first and second gears being closely journaled partially by said inside surface of said pump casing and arranged to receive foam chemical flow from said inlet on a demeshing side of said first and second gears;

third and fourth circular gears arranged in said pump casing downstream of said first and second gears, said first and second gears, said third and fourth gears enmesh together for opposite rotation and closely journaled partially by said inside surface of said pump casing, a demeshing side of said third and fourth gears receiving flow from an enmeshing side of said first and second gears, and an enmeshing side of said third and fourth gears open to said outlet of said pump casing, said third and fourth gears and said first and second gears being coplanar;

said third and fourth gears driven by foam chemical pumped by said first and second gears; and a sensor means for sensing a rotational speed of one of said third and fourth gears for creating a signal proportional to a rotating speed of said one of said third and fourth gears.

16. The additive metering pump according to claim 15 wherein said third and fourth gears comprise lobed rotors.

17. The additive metering pump according to claim 15 wherein said sensor means comprises a noncontact, nonmagnetic RF sensor.

18. The additive metering pump according to claim 15 wherein said third and fourth gears are composed of a nonmagnetic material and one of said third and fourth gears comprises targets embedded in said gear for sensing by said sensor means.

19. A variable flow pump comprising:

a variable speed driver;

a gear pump operably connected to the variable speed driver and having an inlet and flow output;

an undriven gear set comprising two meshed lobed rotors received in a chamber having an inlet and outlet whereby communication from the chamber inlet to the chamber outlet is substantially exclusively through said undriven gear set to impart rotation to the undriven gear set which is relative to flow therethrough;

a noncontact sensor sensing speed of rotation of at least one of the gears of the undriven gear set and effective to generate an output signal representative of the speed of rotation of the undriven gear set; and a controller receiving said signal and generating a second output signal;

the second output signal dependent upon the relationship of volume flow detected by the speed of rotation of the undriven gear set in comparison to a desired volume flow;

the second output operatively connected to the driver and effective to vary the speed thereof;

said gear pump and said undriven gear set are contained within a common housing and are coplanar.

20. A variable flow pump comprising:

a variable speed driver;

a gear pump operably connected to the variable speed driver and having an inlet and flow output;

an undriven circular gear set received in a chamber having an inlet and outlet whereby communication from the chamber inlet to the chamber outlet is substantially exclusively through said undriven gear set to impart rotation to the undriven gear set which is relative to flow therethrough;

a noncontact sensor sensing speed of rotation of at least one of the gears of the undriven gear set and effective to generate an output signal representative of the speed of rotation of the undriven gear set; and a controller receiving said signal and generating a second output signal;

the second output signal dependent upon the relationship of volume flow detected by the speed of rotation of the undriven gear set in comparison to a desired volume flow;

the second output operatively connected to the driver and effective to vary the speed thereof; and wherein said gear pump and said undriven gear set are contained within a common housing and are coplanar with respect to each other.

21. A variable flow pump comprising:

a variable speed driver;

a gear pump operably connected to the variable speed driver and having an inlet and flow output;

an undriven circular gear set received in a chamber having an inlet and outlet whereby communication from the chamber inlet to the chamber outlet is substantially exclusively through said undriven gear set to impart rotation to the undriven gear set which is relative to flow therethrough;

a noncontact sensor sensing speed of rotation of at least one of the gears of the undriven gear set and effective to generate an output signal representative of the speed of rotation of the undriven gear set; and a controller receiving said signal and generating a second output signal;

the second output signal dependent upon the relationship of volume flow detected by the speed of rotation of the undriven gear set in comparison to a desired volume flow;

the second output operatively connected to the driver and effective to vary the speed thereof; and a plate shaped pump chamber and inboard and outboard casings, wherein said gear pump includes rotary gears and said rotary gears and said undriven gear set are rotatably held within said plate shaped pump chamber and are coplanar with respect to each other, said plate shaped pump chamber clamped between said inboard and outboard casings to enclose said rotary gear and said undriven gear seat.

22. A pump and flow sensor combination, comprising:

a pump casing having an inlet and an outlet and an inside surface;

a pump drive shaft connectable to a motor outside said pump casing and penetrating said pump casing;

a first gear and a second gear within said pump casing and enmeshed for opposite rotation, said first gear connected to said pump drive shaft for driven rotation therewith, said first and second gears being closely journaled partially by said inside surface of said pump casing and arranged to receive fluid flow from said inlet on a demeshing side of said first and second gears;

third and fourth gears arranged in said pump casing downstream of said first and second gears, said third and fourth gears enmeshed and closely journaled partially by said inside surface of said pump casing, a demeshing side of said third and fourth gears receiving flow from an enmeshing side of said first and second gears, and an enmeshing side of said third and fourth gears open to said outlet of said pump casing, said third and fourth gears and said first and second gears being coplanar;

said third and fourth gears driven by fluid pumped by said first and second gears;

a sensor means for sensing a rotational speed of one of said third and fourth gears for determining the flow rate of liquid pumped by said first and second gears;

wherein said pump casing includes a pump chamber arranged for holding said first and second gears in a vertical arrangement, and said third and fourth gears in a vertical arrangement adjacent to said first and second gears, and an inboard casing and an outboard casing arranged on opposite sides of said pump chamber, enclosing said first, second, third and fourth gears within said pump chamber.

23. The pump and flow sensor combination according to claim 22, wherein said pump chamber comprises a plate shape with a cavity therethrough forming said inside surface, said plate shape having generally planar surfaces facing said inboard casing and said outboard casing.

24. An additive metering pump comprising:

a pump casing having an inlet and an outlet;

a pump drive shaft connectable to a motor outside said pump casing and penetrating said pump casing;

a first impeller connected to said pump drive shaft for driven rotation therewith;

a second impeller arranged in said pump casing downstream of said first impeller;

said second impeller driven only by fluid pumped by said first impeller, said first and second impeller being coplanar;

a sensor means for sensing a rotational speed of said second impeller for determining the flow rate of liquid pumped by said first impeller;

wherein said pump casing includes a pump chamber arranged for holding said first impeller and second impeller in laterally adjacent position, and an inboard casing and an outboard casing arranged on opposite sides of said pump chamber, enclosing said first and second impellers within said pump chamber.

25. The additive metering pump according to claim 24, wherein said pump chamber comprises a plate shape with a cavity therethrough forming said inside surface, said plate shape having generally planar surfaces facing said inboard casing and said outboard casing respectively.

* * * * *